United States Patent

[11] 3,627,850

[72] Inventors Karl-Heinz Hafner
Bad Orb;
Edgar Fischer, Frankfurt/am, Germany
[21] Appl. No. 9,889
[22] Filed Feb. 9, 1970
[45] Patented Dec. 14, 1971
[73] Assignee Farbwerke Hoechst Aktiengesellschaft vormals Meister Lucius & Bruning
Frankfurt/am Main-Hoechst, Germany
[32] Priorities Aug. 17, 1966
[33] Germany
[31] F 49961;
Sept. 7, 1966, Germany, No. F 50143
Continuation-in-part of application Ser. No. 651,970, July 10, 1967, now Patent No. 3,494,893, Continuation-in-part of application Ser. No. 663,743, Aug. 28, 1967, now abandoned. This application Feb. 9, 1970, Ser. No. 9,889

[54] POLYOXYMETHYLENE POLYMERS HAVING REDUCED MELT INDICES
7 Claims, 1 Drawing Fig.

[52] U.S. Cl. .................................................. 260/823,
260/33.2 R, 260/33.4 R, 260/67 FP, 260/348 R
[51] Int. Cl. ...................................................... C08g 37/04
[50] Field of Search ............................................ 260/823

[56] References Cited
UNITED STATES PATENTS
3,494,893  2/1970  Hafner et al. ................  260/67 A

*Primary Examiner*—Samuel H. Blech
*Attorney*—Curtis, Morris & Safford

ABSTRACT: The melt indices of polyformaldehyde having stabilized terminal groups or copolymers of formaldehyde or trioxane with cyclic ethers are reduced by adding a copolymer of trioxane containing carboxylate groups. The carboxylate-containing polymers may be prepared by copolymerizing trioxane and optionally cyclic ethers with p-glycidyl benzoic acid esters and then saponifying the esters groups. The metal of the carboxylate group is selected from metals of the first two groups of the Periodic Table. By incorporating from 1 to 50 percent by weight of the carboxylate-containing polymers in conventional polyoxymethylene polymers, the melt indices thereof are substantially reduced.

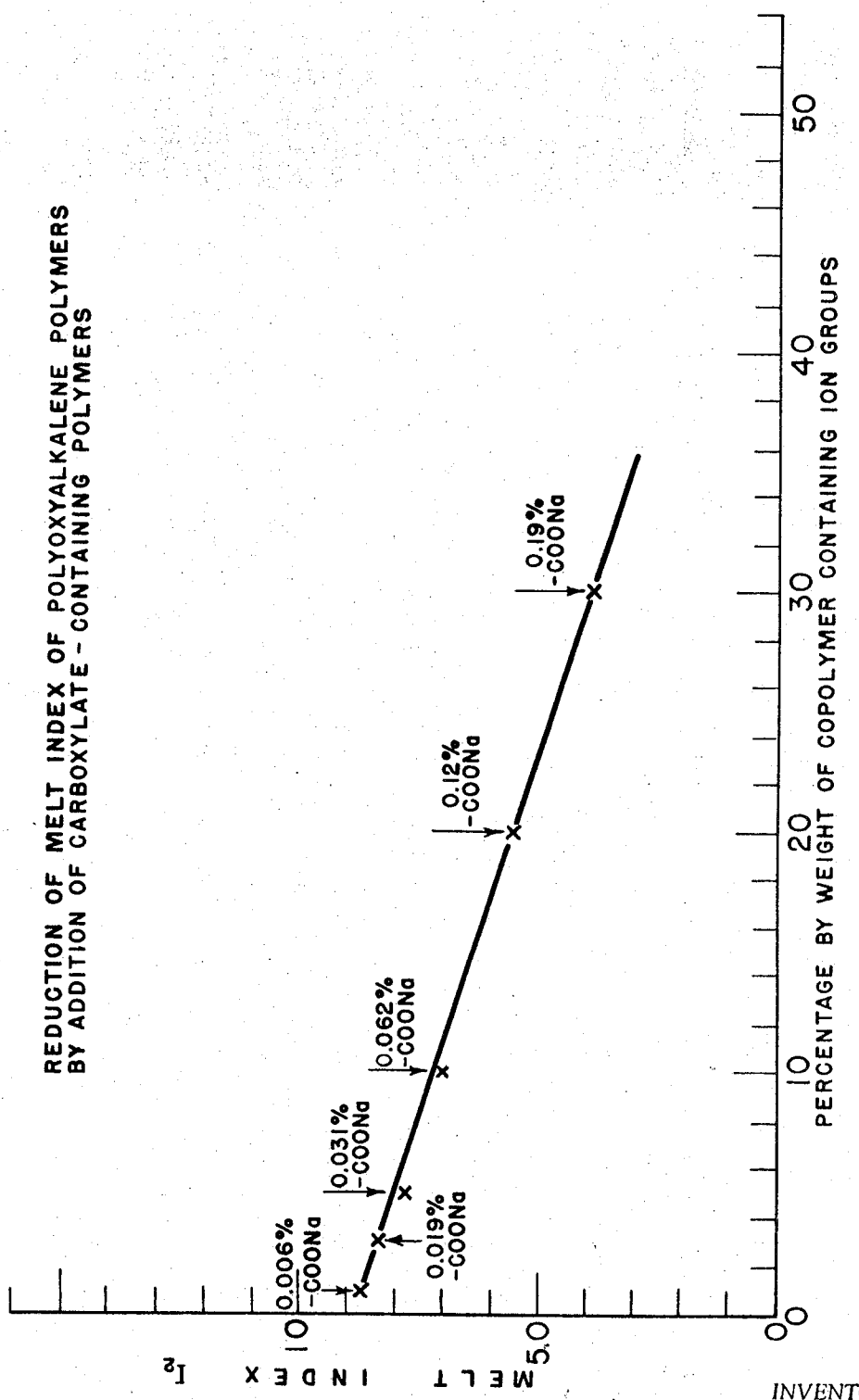

POLYOXYMETHYLENE POLYMERS HAVING REDUCED MELT INDICES

This application is a continuation-in-part of copending applications Ser. No. 651,970 filed July 10, 1967, now Pat. No. 3,494,893 and Ser. No. 663,743 filed Aug. 28, 1967, now abandoned.

The present invention provides macromolecular polyoxymethylenes having reduced melt indices. It is known that homo- and copolymers of formaldehyde or trioxane having difference molecular weights or melt indices, can only be mixed to a limited extent, since otherwise the physical and mechanical properties of the mixture become very different from those of the starting polymer. For example, it is not possible to mix a copolymer of 100 parts by weight of trioxane and two parts by weight of ethylene oxide having a melt index $I_2$ of 9 (ASTM-D 1238–52T), with a terpolymer of 100 parts by weight of trioxane, two parts by weight of ethylene oxide and 0.1 part by weight of butane-diol diglycidyl ether whose melt index is less than 0.1, in such a manner that the polymer mixture has a melt index $I_2$ of, for example, 4 without completely modifying the properties of the copolymer used for mixing. It is, moreover, necessary to add the terpolymer in an amount of up to about 93 percent by weight in order to achieve any effect at all. There is, furthermore, the difficulty that an increasing addition of copolymer having a high molecular weight (low melt index $I_2$), does not bring about a linear reduction of the melt index of the mixture, but rather a sudden drop of the melt index which is difficult to control.

We have now found that the melt indices of macromolecular homo- or copolymers of formaldehyde or copolymers of trioxane can be reduced by adding, to these polymers, from 1 to 50 percent by weight of a copolymer of trioxane containing from 0.1 to 20 percent by weight of carboxylate groups. Such reduction of melt indices is graphically illustrated in the accompanying drawing.

Suitable copolymers of trioxane containing carboxylate groups have structural units linked to their polymer chain, which are characterized by the following general formula (I):

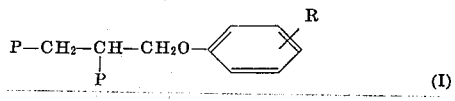

in which P represents polyoxymethylene units which may be interrupted by structural units of cyclic ethers of the general formula (II):

in which $R_1$ and $R_2$ each represents a hydrogen atom, an alkyl- or halo-alkyl radical, $R_3$ represents a methylene- or oxymethylene radical which may be substituted by an alkyl or a halo-alkyl group, $n$ represents an integer of from 0 to 3 and the above-mentioned alkyl radicals and halo-alkyl radicals contain one to five carbon atoms which may be substituted by zero to three halogen atoms, preferably chlorine atoms.

R represents one of the groups

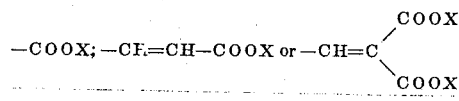

in which R may be in ortho-, meta- or paraposition. X symbolizes cations of elements of the first or second principal group in the Periodic Table, such as Li, Na, K, Be, Mg. Ca, Sr, Ba.

In addition to trioxane and compounds having carboxylate groups, the copolymers may also contain cyclic ethers in an amount ranging from 0 to 10 percent by weight, calculated on the whole monomer mixture. Suitable cyclic ethers are, for example, ethylene oxide, propylene oxide, 1,4-butane-diol formal, diethylene glycol formal, oxacyclobutane and 1,3-dioxolane.

The copolymers of trioxane which contain carboxylate groups may be prepared by the following methods: Saponification of co- or terpolymers of trioxane/glycidoxy benzoic acid esters or trioxane/cyclic ethers/glycidoxybenzoic acid esters with bases; oxidation of copolymers of trioxane which contain free aldehyde groups and subsequent treatment with bases; condensation of copolymers of trioxane which contain free aldehyde groups with malonic acid and subsequent treatment with bases and condensation of copolymers of trioxane which contain free aldehyde groups with the salts of malonic acid.

Especially advantageous properties are inherent in copolymers which consist of trioxane and sodium salt of p-glycidoxy benzoic acid or of trioxane, ethylene oxide and barium salt of p-glycidoxy benzoic acid or of trioxane, ethylene oxide and potassium salt of p-glycidoxy-cinnamic acid or of trioxane, ethylene oxide and sodium salt of p-glycidoxy benzalomalonic acid.

The following examples illustrate the preparation of trioxane copolymers containing ester and aldehyde groups and the conversion thereof to polymers containing carboxylate groups suitable for addition to conventional polyoxymethylene polymers to reduce the melt indices thereof in accordance with the present invention.

EXAMPLE A

Twenty Millimeters of $BF_3$-dibutyl-etherate as a catalyst (diluted to a ratio of 1:40 with cyclohexane) were added to a batch consisting of 1,000 grams of trioxane, 20 grams of ethylene oxide and 30 grams of p-glycidoxy-benzoic acid methylester. In a closed vessel the batch was polymerized in a thermally constant bath of 70° C. The polymerization time was 60 minutes. The polymer block obtained was ground and treated for 30 minutes at 150° C. in benzyl alcohol containing 1 percent by weight of triethanol amine, for eliminating the instable semiacetal terminal groups and the residual monomers. When cool, the polymer was filtered with suction, boiled several times with methanol and dried in vacuo at a temperature in the range of from 50° to 70° C. The yield of polymer was 822 grams.

The following values were measured in the polymer obtained: The reduced specific viscosity $\eta_{red.}$ was 0.33 dl/g. (50 milligrams of the polymer were dissolved in 10 milliliters of butyrolatone containing 2 percent of diphenyl amine, at 140° C. and, at this temperature, the viscosity was measured). The thermostability $K_D$ was 0.0164 percent per minute. For this purpose, a sample of the polymer was stabilized with 0.7 percent by weight of 2,2'-methylene-bis (4-methyl-6-tert.-butyl-phenol) and 0.2 percent by weight of dicyano-diamide and was then subjected to a thermal degradation at 230° C. for 45 minutes.

The ester groups of the polymer may be saponified with aqueous alkali in known manner to convert them to carboxylate groups.

EXAMPLE B

In a manner analogous to example A, 1,000 grams of trioxane, 20 grams of ethylene oxide and 50 grams of p-glycidoxy-benzoic acid methyl ester were polymerized with 10 milliliters of $BF_3$-dibutyl-etherate (in a 1:40 dilution). After the alkaline degradation, the yield was 738 grams of a polymer having a melt index $i_2$ of 3.7 grams per 10 minutes (ASTM-D 1238–52T).

A portion of this polymer was saponified to convert ester groups thereof to carboxylate groups. A mixture of 100 milliliters of a 2N-sodium hydroxide solution and 200 milliliters of methanol was prepared and 20 grams of the polymer suspended therein. The suspension was heated to and maintained at a reflux temperature for a period of 12 hours. The resulting polymer contained sodium carboxylate groups.

EXAMPLE C

The procedure of example B was followed except that 100 milliliters of a saturated barium hydroxide solution was used in place of the sodium hydroxide solution to obtain a polymer containing barium carboxylate groups.

EXAMPLE D

Twenty milliliters of $BF_3$-dibutyl-etherate as a catalyst (diluted to a ratio of 1:40 with cyclohexane) were added to a batch consisting of 1,000 grams of trioxane, 20 grams of ethylene oxide and 50 grams of p-glycidoxybenzaldehyde. In a closed vessel the batch was polymerized in a thermally constant bath of 70° C. The polymerization time was 60 The minutes. The polymer block obtained was ground and treated for 30 minutes at 150° C., in benzyl alcohol containing 1 percent by weight of triethanol amine, for eliminating the unstable semiacetal terminal groups and the residual monomers. When cool, the polymer was filtered with suction, boiled several times with methanol and dried in vacuo at a temperature in the range of from 50° to 70° C. The yield of polymer was 840 grams.

According to example A the following values were measured in the polymer obtained: $\eta_{red}$=0.34 dl/g. $K_{tl}$=0.021 percent per minute.

EXAMPLE E

Ten grams of a terpolymer prepared from 100 grams of trioxane, 2 grams of ethylene oxide and 5 grams of p-glycidoxybenzaldehyde, having a reduced specific viscosity $\eta_{red}$=0.33 dl/g. (measured according to example A), were mixed with 5 grams of malonic acid, 50 milliliters of pyridine and a trace of piperidine and then the mixture was heated for 5 hours at 100° C., while stirring. The carbon dioxide being formed was removed by means of a current of nitrogen passing through the reaction mixture. After cooling the polymer was suction filtered, washed with water and then with methanol, then extracted by boiling methanol, again suction filtered and dried. The colorless polymer obtained had a reduced specific viscosity $\eta_{red}$=0.34 dl/g. (measured according to example A). According to the UR-spectrum the polymer showed free carboxyl groups as well as conjugated double bonds.

This polymer was then neutralized to convert the free carboxyl groups thereof to carboxylate groups. The polymer was suspended in a mixture of 500 milliliters of a 2N-sodium hydroxide solution, 10 grams of urea and 1000 milliliters of methanol and then refluxed for 15 hours, while stirring. After cooling the polymer was suction filtered, washed with water and then with methanol until neutral, thereafter extracted by boiling 50 percentage aqueous methanol, again suction filtered, washed with methanol and dried. According to the UR-spectrum the polymer now showed carboxylate groups instead of carboxyl groups.

EXAMPLE F

Ten grams of a terpolymer prepared from 100 grams of trioxane, 2 grams of ethylene oxide and 5 grams of p-glycidoxybenzaldehyde, having a reduced specific viscosity $\eta_{red}$= red0.33 dl/g. (measured according to example A), were mixed with 100 milliliters of pyridine and 10 milliliters of 30 percent hydrogen peroxide and heated for 60 minutes at 100° C., while vigorously stirring. After cooling the polymer was suction filtered, washed with methanol until free of pyridine, then extracted by boiling methanol, again suction filtered and dried under a pressure of 200 torr at a temperature of 50° to 70° C. The resulting white polymer had a reduced specific viscosity $\eta_{red}$=0.31 dl/g. (measured according to example A). According to the UR-spectrum the polymer showed free carboxyl groups.

Corresponding to example E the polymer obtained was neutralized. According to the UR-spectrum the polymer then showed carboxylate groups instead of carboxyl groups.

EXAMPLE G

Example E was repeated using the equivalent amount of the disodium salt of malonic acid instead of free malonic acid.

EXAMPLE H

A mixture of 1 mol of p-hydroxybenzoic acid methyl ester, 1 to 1.5 liter epichlorhydrine and 150 grams of a basic ion exchanger containing quaternary ammonium groups was refluxed for 5 to 7 hours. The hot mixture was filtered and the ion exchanger was washed with epichlorhydrine. The filtrate was distilled under reduced pressure to remove the excess of epichlorhydrine and the residue was recrystallized from methanol. There was obtained p-glycidylbenzoic acid methyl ester in an amount of 45 percent having a melting point of 60° C.

As homopolymers of formaldehyde are used polyoxymethylenes having a molecular weight of at least 10,000 and whose terminal OH groups are stabilized against the thermal degradation by etherification or esterification. (The etherification of polyoxymethylenes with alcohols in the presence of sulfuric acid is disclosed in U.S. Pat. No. 2,512,950; the etherification of terminal OH groups of polyoxymethylene with aliphatic acetals in an acid solution is disclosed in U.S. Pat. No. 3,161,616 and the esterification of terminal OH groups of polyoxymethylene with acetic acid anhydride is disclosed in U.S. Pat. No. 2,998,409).

As copolymers of formaldehyde or trioxane are used copolymers of from 80 to 99.9 percent by weight of formaldehyde and from 0.1 to 20 percent by weight of cyclic ethers, preferably from 80 to 99.9 percent by weight of trioxane and from 0.1 to 20 percent by weight of cyclic ethers. These are known copolymers and may be made by conventional methods.

As cyclic ethers are used, for example, compounds of the general formula (III)

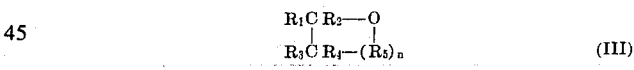

(III)

in which $R_1$ to $R_4$ each represents a hydrogen atom or an alkyl radical or alkyl radical substituted by halogen, $R_5$ represents a methylene- or an oxy-methylene radical or a methylene radical substituted by alkyl or halo-alkyl groups, and $n$ symbolizes an integer of from 0 to 3, or $R_5$ represents the grouping —(O-$CH_2$—$CH_2$)$_m$—$OCH_2$—, when $n$ is 1, and $m$ is an integer of from 1 to 3. The above-mentioned radicals may contain from one to five carbon atoms and may be substituted by 0 to three halogen atoms, preferably chlorine atoms. As cyclic ethers are especially suitable ethylene oxide, glycol formal and diglycol formal, furthermore, propylene oxide, epichlorhydrin and 4-chloromethyl-dioxolane.

The copolymers of trioxane which contain from 0.1 to 20 percent by weight of carboxylate groups, are mixed in an amount ranging from 1 to 50 percent by weight, preferably from 2 to 40 percent by weight, with homo- or copolymers of formaldehyde and trioxane. Especially preferred amounts are in the range of from 3 to 30 percent by weight. In this case, a linear reduction of the melt index of the polymer mixture is brought about by the increasing addition of copolymers of trioxane which contain carboxylate groups. The linearity of this relationship is illustrated in the accompanying drawing. In contrast to other polymers, the copolymers of trioxane need only be added in comparatively small amount to produce the desired effect. Thus the mixture may contain only about 0.001 to 1 percent by weight of carboxylate groups.

The polymers are mixed in mixers, extruders or kneaders. They may, moreover, also be mixed in solution by dissolving the components to be mixed in benzyl alcohol or in ethyl diglycol at elevated temperature and by precipitating them jointly when cooling.

The mixture of copolymers prepared according to the invention are thermostable and can be processed thermoplastically. After polymerization, their flow properties can be regulated in a desired manner. The modified mixtures thus obtained are especially suitable as extrusion and extrusion blow materials.

The following examples are given to illustrate the manner of preparing the compositions of the present invention and the improved melt indices exhibited by these compositions. It is of course to be understood that these examples are merely illustrative and that the invention is not intended to be limited thereto. In the examples reference is made to conventional macromolecular polyoxymethylene polymers designated as M and N. Polymer M was a conventional copolymer made from 100 parts by weight of trioxane and two parts of ethylene oxide and had a melt index $I_2$ of 9.3 grams per 10 minutes. Polymer N was a conventional homopolymer of formaldehyde having acetate terminal groups and a melt index $I_2$ of 12 grams per 10 minutes.

EXAMPLES 1 to 7

Various quantities of a carboxylate containing copolymer prepared as in example B above were thoroughly and intimately mixed in a mixer with separate portions of trioxane copolymer M to form mixtures that were stabilized by incorporating therein 0.7 percent of 2,2-methylene-bis-4-methyl-6-tertiary-butyl phenol and 0.2 percent of dicyandiamide. The melt index in grams per 10 minutes and the percentage of carboxylate were determined for each mixture and are tabulated below. Polymer weights are given in grams.

TABLE I

| Example No. | Polymer M | Polymer B | $I_2$ | %-COONa |
|---|---|---|---|---|
| 1 | 4.95 | 0.05 | 8.7 | 0.006 |
| 2 | 4.85 | 0.15 | 8.3 | 0.019 |
| 3 | 4.75 | 0.25 | 7.8 | 0.031 |
| 4 | 4.50 | 0.50 | 7.0 | 0.062 |
| 5 | 4.00 | 1.00 | 5.6 | 0.12 |
| 6 | 3.75 | 1.25 | 4.8 | 0.16 |
| 7 | 3.50 | 1.50 | 3.9 | 0.19 |

The data of table I show that the addition of even relatively small amounts of polymer B to polymer M produced significant reductions in the melt index of the mixture.

EXAMPLES 8 TO 12

Various amounts of a polymer containing barium carboxylate groups and prepared as in example C above were mixed with separate portions of polymer M and the mixtures stabilized as in examples 1 to 7. The melt index and percent carboxylate of each mixture was measured with the results given in table II.

TABLE II

| Example No. | Polymer M | Polymer C | $I_2$ | % $(COO)_2Ba$ |
|---|---|---|---|---|
| 8 | 4.85 | 0.15 | 8.0 | 0.020 |
| 9 | 4.75 | 0.25 | 7.5 | 0.033 |
| 10 | 4.50 | 0.50 | 6.5 | 0.070 |
| 11 | 4.00 | 1.00 | 5.1 | 0.13 |
| 12 | 4.50 | 1.50 | 3.2 | 0.20 |

EXAMPLES 13 TO 15

Various amounts of a polymer containing dipotassium malonate groups prepared as in example E above were mixed with separate portions of polymer M and the mixtures stabilized as in examples 1 to 7. The melt indices of the mixtures were measured with the results given in table III.

TABLE III

| Example No. | Polymer M | Polymer F | $I_2$ |
|---|---|---|---|
| 13 | 4.85 | 0.15 | 8.8 |
| 14 | 4.50 | 0.50 | 7.6 |
| 15 | 4.00 | 1.00 | 5.6 |

EXAMPLE 16

A polymer mixture was prepared of 0.05 grams of polymer F containing potassium malonate groups and 4.95 grams of polymer N (formaldehyde homopolymer). After stabilization as in examples 1 to 7, the melt index $I_2$ of the mixture was measured and found to be 8.4 grams/10 minutes.

COMPARATIVE EXAMPLE

A terpolymer of trioxane, ethylene oxide and p-glycidoxybenzaldehyde was prepared in a manner described in example D.

The terpolymer as thus prepared was cross-linked with terephthalic acid dihydrazide in the following manner: 30 Grams of the terpolymer were dissolved in 300 milliliters of benzyl alcohol at 130° C. and 3 grams of terephthalic acid dihydrazide were added. The mixture was maintained for 30 minutes at 130° C. After cooling there was obtained a cross-linked product which was extracted by boiling methanol several times. After drying the melt index $I_2$ of the product was measured and found to be 0.2 grams/10 minutes.

Various amounts of the cross-linked terpolymer as thus prepared were mixed with separate portions of polymer M and the mixtures stabilized as in examples 1 to 7. The melt indices of the mixtures were measured with the results given in table IV.

TABLE IV

| Polymer M | Cross-linked Polymer | $I_2$ |
|---|---|---|
| 4.95 | 0.05 | 9.5 |
| 4.85 | 0.15 | 9.5 |
| 4.75 | 0.25 | 9.5 |
| 4.50 | 0.50 | 9.5 |
| 4.00 | 1.00 | 9.4 |
| 3.50 | 1.50 | 9.5 |

The data of table IV show that the addition of the cross-linked copolymer to the conventional trioxane copolymer M produced no significant reduction in the melt index of the mixture.

We claim:

1. A polymer composition consisting essentially of a mixture of (a) polyformaldehydes having etherified or esterified terminal groups or copolymers of formaldehyde with cyclic ethers or copolymers of trioxane with cyclic ethers, and (b) from 1 to 50 percent by weight of a copolymer of trioxane having structural units of the general formula

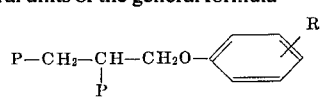

in which P represents polyoxymethylene units which may be interrupted by units derived from cyclic ethers, R represents the group —COOX, —CH CH—COOX or

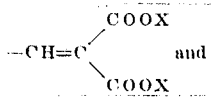 and

X represents a metal of the first or second group of the Periodic Table.

2. A composition according to claim 1 wherein P consists essentially of polyoxymethylene units.

3. A composition according to claim 1 in which P represents polyoxymethylene units which are interrupted by structural units of cyclic ethers corresponding to the general formula

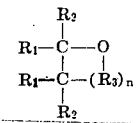

in which $R_1$ and $R_2$ each represents a hydrogen atom, an alkyl or halo-alkyl radical, $R_3$ represents a methylene- or oxymethylene radical which may be substituted by an alkyl- or halo-alkyl group, and $n$ is an integer of from 0 to 3, the alkyl- and halo-alkyl radicals containing one to five carbon atoms which may be substituted by 0 to 3 halogenatoms.

4. A composition according to claim 1 in which copolymer (b) is a copolymer containing sodium salt of p-glycidoxy benzoic acid.

5. A composition according to claim 1 in which copolymer (b) is a copolymer containing barium salt of p-glycidoxy benzoic acid.

6. A composition according to claim 1 in which copolymer (b) is a copolymer containing potassium salt of p-glycidoxybenzalomalonic acid.

7. A composition according to claim 1 in which the mixture contains from 0.001 to 1 percent by weight of carboxylate groups.

* * * * *